United States Patent

[11] 3,593,269

[72] Inventor Olin N. Richardson
 5539 Adams, Ashtabula, Ohio 44404
[21] Appl. No 846,469
[22] Filed July 31, 1969
[45] Patented July 13, 1971

[54] VEHICLE TIRE PRESSURE MONITORING SYSTEM
 9 Claims, 6 Drawing Figs.
[52] U.S. Cl. ................................................. 340/58,
 200/61.23
[51] Int. Cl. ..................................................... B60c 23/00
[50] Field of Search .......................................... 340/58;
 200/61.22, 61.23; 116/34

[56] References Cited
UNITED STATES PATENTS
2,096,540 10/1937 Giroux ........................ 200/61.23

Primary Examiner—Alvin H. Waring
Attorney—Stepno and Neilan

ABSTRACT: A system for detecting and warning of low air pressure in a vehicle tire which comprises an electrically responsive signaling device actuated by the closure of a pair of electrically conducting contact points secured to an inside surface of the sidewall portion of the tire. The contact points are vertically spaced from one another in a region of the tire wall which flexes in response to loss of air pressure within the tire. Electrical energy is supplied by the vehicle ignition system.

PATENTED JUL 13 1971

INVENTOR
OLIN N. RICHARDSON

BY
Stepno and Neilan
ATTORNEYS

PATENTED JUL 13 1971 3,593,269

INVENTOR
OLIN N. RICHARDSON

BY
Stepno and Neilan
ATTORNEYS

VEHICLE TIRE PRESSURE MONITORING SYSTEM

BACKGROUND OF THE INVENTION

The present invention relates to an electrical system adapted to monitor air pressure in vehicle tires and to warn the driver if the pressure falls below a certain preselected level.

Proper tire pressure is an important aspect of vehicle maintenance often overlooked or neglected by many automobile owners. As a result, many otherwise useable miles of tire life are lost, and extra expense for tire replacement is needlessly incurred.

This situation is explained perhaps by the fact that visual examination of the average vehicle tire provides a very poor basis for gauging tire pressure except in the extreme situation when as little as one-third or one-half normal pressure exists. A significant amount of unnecessary tread wear and cord damage occurs before such low pressure levels are reached. Moreover, despite the existence of the relatively inexpensive and easy to use device known as a tire gauge, the fact remains that the average motorist just does not take the time or make the effort to use this device even if one is available.

To solve this problem there is needed a practical system for detecting a loss of vehicle tire air pressure and furthermore warning the driver of such a condition. The system must be reliable, relatively inexpensive, and fully automatic as to require no conscious effort on the part of the motorist.

SUMMARY OF THE INVENTION

The present invention provides a practical system for automatically detecting and warning of low air pressure in vehicle tires. The system comprises an electrical circuit having: (a) a pair of metallic contact points spaced in vertical relationship, and secured to an inside surface of the sidewall portion of a vehicle tire such that when the tire wall is compressed from lack of sufficient air pressure within the tire, the metallic points will be brought into contact with one another, one of said points being grounded to the vehicle tire rim, (b) an electric signaling device, and (c) means for establishing electrical contact between the ungrounded contact point and the signaling device. This electrical circuit is supplied with current from the vehicle ignition system, and is designed to emit a warning signal from the signaling device upon the closing of the metallic contact points to complete the circuit.

In a typical embodiment of the present invention, the pair of metallic contact points is embodied in a plastic member, preferably rubber, which is adapted for securing to an inside surface of the sidewall portion of a vehicle tire. Any type of signaling device may be employed, as for example an alarm which emits audible signals, a light which emits visible signals, or a combination of the two devices.

In a presently preferred embodiment, the means for establishing electrical contact between the ungrounded metallic contact point and the signaling device comprises: (a) a continuous metallic ring mounted on the vehicle tire rim, and insulated therefrom, and an insulated wire connecting the metallic ring to the ungrounded contact point, and (b) an electrical pickup brush member adjustably mounted on a nonrotating portion of the vehicle brake assembly and adapted to establish contact with the continuous metallic ring. In such an embodiment the pickup brush may comprise a replaceable carbon rod, spring biased into contact with the metallic ring.

DETAILED DESCRIPTION OF THE INVENTION

Figure 1:
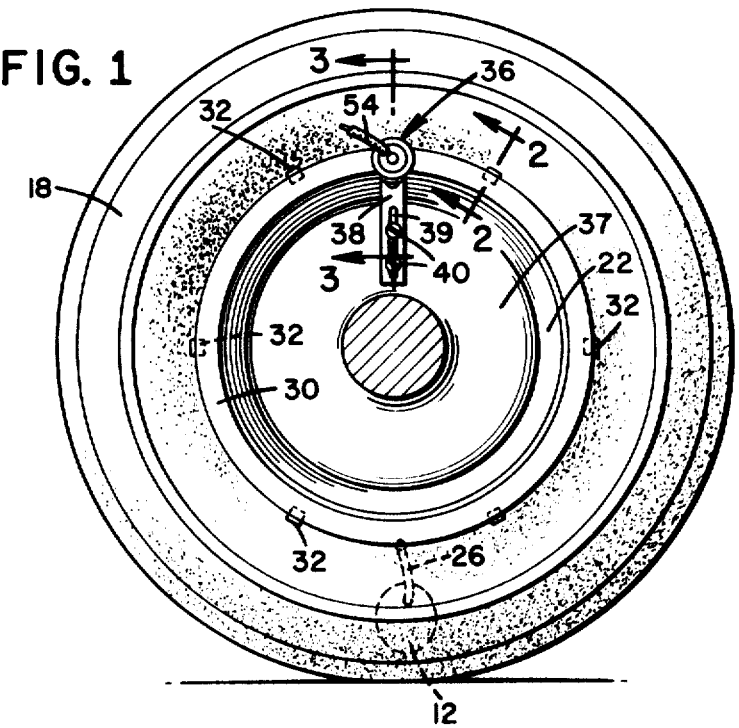
FIG. 1 is an elevational view of a vehicle tire with the necessary attachments as viewed from the vehicle-side of the tire.

Referring now to the drawings, the present system for detecting and warning of low air pressure is adapted for use in a vehicle tire indicated generally by reference numeral 10 in FIG. 1. The system works on the principle that at a particular radial position on the sidewall portion of the tire, for example in the locus of area 12 which may be at any point on the tire circumference of corresponding radial position, the tire wall will flex so as to be compressed or collapsed in response to small losses of tire air pressure.

Figure 4:
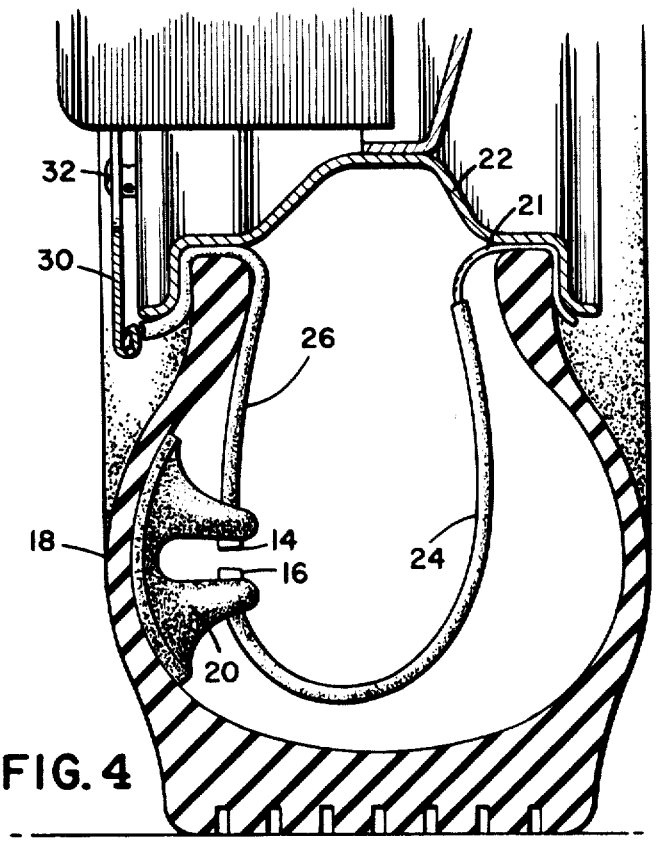
FIG. 4 is a vertical cross-sectional view of a tire carcass and rim assembly containing the metallic contact points and connecting wires.

Referring now to FIG. 4, a pair of vertically spaced metallic contact points 14 and 16 are secured to an inside surface of the sidewall portion of the tire carcass 18. In the embodiment illustrated, the contact points are embodied in a rubber member or patch 20 which is adhesively secured to the tire wall. The contact point 16 is grounded at point 21 to the rim 22 of the vehicle tire by means of wire 24 confined within the tire. Wire 24 may be secured in place solely by the force exerted against the tire rim 22 by the tire carcass 18. The other contact point 14 is connected through an insulated wire 26 to a metallic ring 30 which will be hereafter described more fully. It should be noted that wire 26 and the ring 30 are completely insulated from the tire rim 22 to avoid any possibility of short circuiting.

Figure 5:
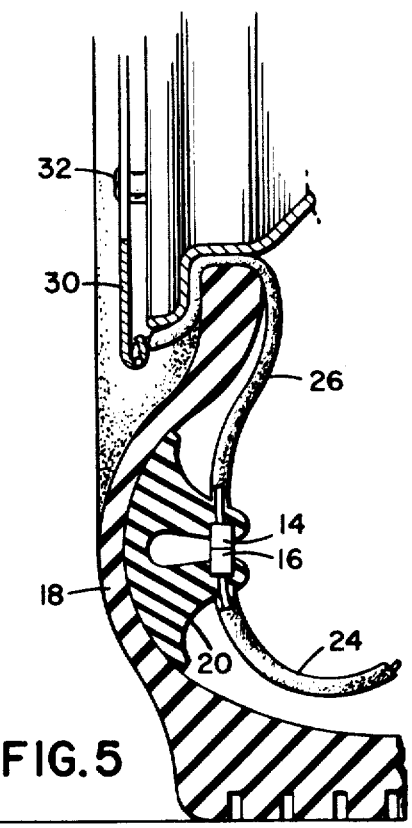
FIG. 5 is a view similar to FIG. 4 illustrating the metallic contact points in closed position.

In FIG. 5 is presented a view of the tire carcass and contact point assembly for a tire showing deficiency in air pressure. As a result of the deficiency, the tire carcass 18 has been compressed or collapsed in the sidewall portion, thereby causing the metallic points 14 and 16 which are secured to that portion of the tire to make contact with one another. It will be appreciated that the present system may be set to detect tire pressures below any desired level by merely varying the vertical spacing of the metallic contact points. Furthermore, tolerances of as little as 4 to 5 p.s.i. can be monitored with proper adjustment of the instant invention.

In order to complete the electrical circuit of the present system and obtain a warning signal, means must be provided for establishing electrical contact between the portion of the circuit inside the tire and the remainder of the circuit containing the signaling device and source of electrical energy, e.g. ignition system. Such electrical contact need only be established in that portion of the tire revolution where the section containing the metallic points bears the weight of the vehicle, since only in this region will the metallic points be forced together. However, it is presently preferred to provide means whereby continuous electrical contact is maintained between the signaling device and the metallic points within the tire. Such means, pictured generally in FIG. 1, comprises the metallic ring 30 which is mounted on the vehicle tire rim by means of a plurality of clips or tongues 32. Metals of high electrical conductivity such as copper or brass are preferred for use in the ring member. Alternatively, the continuous metallic ring 30 can be a laminate of conductive metal laminated to an insulator, in which case the insulator side of the composite ring can be conveniently adhered to the vehicle side of the tire as by a suitable adhesive or the like, and thus eliminating the need for the clips or tongues 32.

Figure 2:
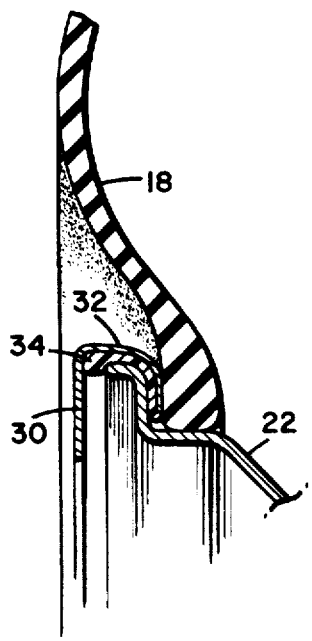
FIG. 2 is a cross-sectional view taken along the line 2-2 of FIG. 1.

As noted above, the metallic ring must be electrically insulated from the tire rim to avoid short circuiting with contact point 16 which is grounded to the rim. One mode of securing the ring to the tire rim is illustrated in FIG. 2 where affixed to the ring 30 is shown a tongue 32 which is secured over the edge of the tire rim 22. Positioned between the tongue and the tire rim is a layer of insulating material 34 which may be any suitable insulator such as rubber or other plastic material. As seen from the illustration, the pressure of the tire carcass 18 against the tire rim 22 acts to secure the tongue 32, and thereby the metallic ring, to the tire rim. A plurality of such tongues are provided around the circumference of the metallic ring.

The second component of the electrical contact assembly comprises a pickup brush member 36 adjustably mounted on a nonrotating portion of the vehicle brake mechanism 37, e.g. either the brake drum for conventional brakes or the shoeholder for disc type brakes. Radial adjustment is achieved by means of a mounting bracket 38 having an elongated aperture 39 adapted to accept mounting screws 40.

Figure 3:
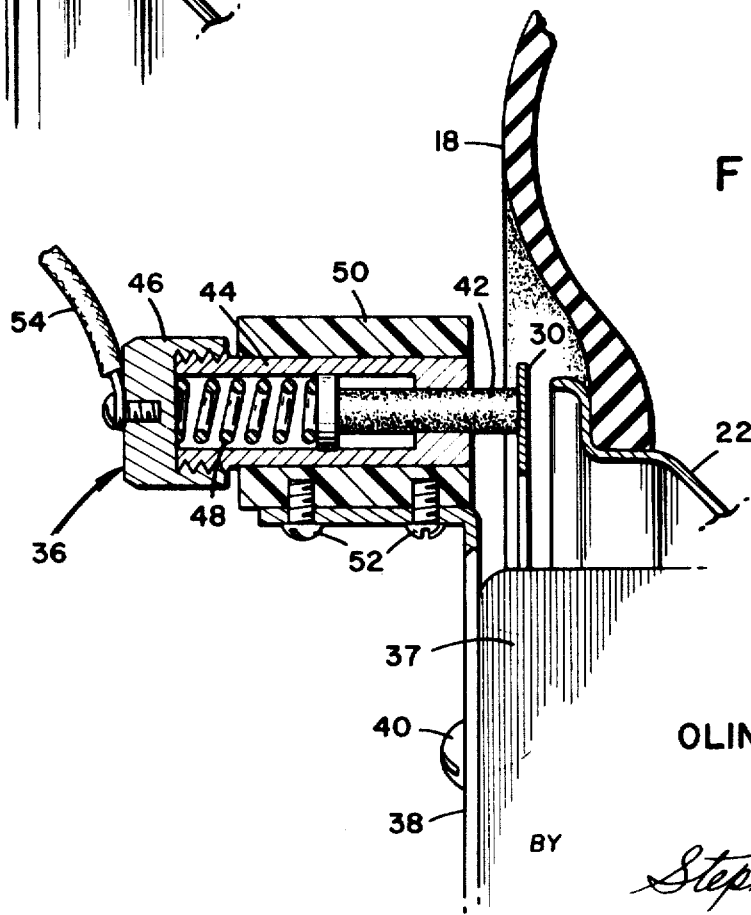
FIG. 3 is a cross-sectional view taken along the line 3-3 of FIG. 1.

A detailed side view of the brush assembly is presented in FIG. 3 of the drawings. A typical electrical pickup brush is illustrated as comprising a replaceable conductive rod 42, for example one made of carbon, held in a conductive metal casing 44 fitted with a threaded cap 46. Inside the metal casing is a spring 48 which acts to bias the conductive pickup rod against the metallic ring 30 to insure continuous contact. Such an assembly assures electrical contact as the replaceable rod wears away under use. As discussed above, the pickup brush is mounted on the brake assembly 37 by means of bracket 38. Since it is imperative that the pickup brush be electrically insulated from the vehicle frame, an annular bushing 50 of insulating material surrounds the metal casing 44, and the pickup brush itself is secured to the mounting bracket 38 by means of screws 52 embedded in the insulator material. Suitable insulating materials for the annular bushing include ceramics and synthetic resins.

Figure 6:
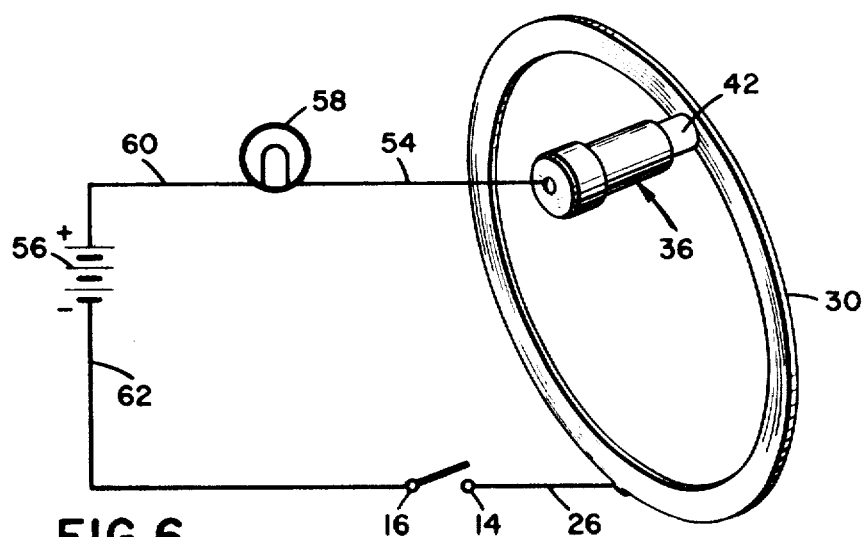
FIG. 6 is a schematic representation of the electrical circuit which forms the monitoring system of the present invention.

The electrical contact assembly comprised of the metallic ring and electrical pickup brush is connected into the remainder of the electrical circuit through the insulated wire 54 emanating from the back of the pickup brush. The circuit as a whole is schematically represented in FIG. 6. Shown there is the metallic ring 30, pickup brush assembly 36, metallic contact points 14 and 16, electrical energy source 56 and signaling device 58.

The connecting wires 26 and 54 correspond to those insulated wires previously discussed in connection with the same reference numerals. Wire 60 may likewise consist of conventional insulated wire. However, the completion of the electrical circuit through conductor 62 does not utilize wire, but rather the vehicle frame instead. As is standard with most vehicles, the negative pole of the battery is grounded to the vehicle frame. As previously indicated, the source of electrical energy 56 is most conveniently supplied by the ignition system of the vehicle.

The signaling device 58 can be any electrically responsive device capable of emitting an audible signal, e.g. a buzzer or bell, or a visible signal, e.g. a light. In a presently preferred embodiment of this invention there is employed a combination of the two types of signaling devices. In a typical such arrangement, the vehicle dashboard contains a panel having a visible indicator for each tire being monitored by the present system, and a single audible indicator which will be actuated by any one of the electrical circuits. Thus upon loss of tire pressure, the motorist will be alerted by the audible signal and then can immediately ascertain which tire is losing air.

It is to be understood that the above-described arrangements are illustrative of the application of the principles of the invention, and that numerous other arrangements may be devised by those of ordinary skill in the art. Thus, by way of example, an optional system may be incorporated to monitor the air pressure of a towed vehicle such as a trailer. In addition, mechanical changes which do not depart significantly from applicant's structures may be employed. Accordingly, from the foregoing remarks, it is to be understood that the present invention is to be limited only by the spirit and scope of the appended claims.

What I claim is:

1. A system for detecting and warning of low air pressure in a vehicle tire which comprises an electrical circuit having: (a) a pair of metallic contact points spaced in vertical relationship, and secured to an inside surface of the sidewall portion of a vehicle tire such that when the tire wall is compressed from lack of sufficient air pressure within the tire, the metallic points will be brought into contact with one another, one of said points being grounded to the vehicle tire rim, (b) an electric signaling device, and (c) means for establishing electrical contact between the ungrounded contact point and the said signaling device, said electrical circuit being designed to emit a signal from said signaling device upon closing of said metallic contact points.

2. A detection and warning system according to claim 1, wherein the pair of metallic contact points is embodied in a plastic member secured to an inside surface of the sidewall portion of a vehicle tire.

3. A detection and warning system according to claim 2, wherein said plastic is rubber.

4. A detection and warning system according to claim 1, wherein said electric signaling device comprises an alarm which emits audible signals.

5. A detection and warning system according to claim 1, wherein said electric signaling device comprises a light which emits visible signals.

6. A detection and warning system according to claim 1, wherein said electric signaling device comprises in combination an alarm and a light.

7. A detection and warning system according to claim 1, wherein said means for establishing electrical contact between the ungrounded contact point and the signaling device comprises: (a) a continuous metallic ring mounted on the vehicle tire rim and insulated therefrom, and an insulated wire connecting the continuous metallic ring to the ungrounded metallic contact point, and (b) an electrical pickup brush member adjustably mounted on a nonrotating portion of the vehicle brake assembly and adapted to establish contact with the continuous metallic ring.

8. A detection and warning system according to claim 7, wherein the electrical pickup brush member comprises a replaceable carbon rod spring biased into contact with said continuous metallic ring.

9. A detection and warning system according to claim 1, wherein said electrical circuit is supplied with electrical energy from the vehicle ignition system.